No. 889,686. PATENTED JUNE 2, 1908.
A. HODSON.
SAFETY DEVICE FOR ELEVATORS.
APPLICATION FILED JAN. 9, 1908.

2 SHEETS—SHEET 1

Albert Hodson,
Inventor

Witnesses:

No. 889,686. PATENTED JUNE 2, 1908.
A. HODSON.
SAFETY DEVICE FOR ELEVATORS.
APPLICATION FILED JAN. 9, 1908.

2 SHEETS—SHEET 2.

Witnesses
R. J. Beall.
W. C. Duvall.

Inventor
Albert Hodson
By Jno. B. Thomas & Co.
Attorney

UNITED STATES PATENT OFFICE.

ALBERT HODSON, OF LINCOLN, ILLINOIS.

SAFETY DEVICE FOR ELEVATORS.

No. 889,686.

Specification of Letters Patent.

Patented June 2, 1908.

Application filed January 9, 1908. Serial No. 409,946.

*To all whom it may concern:*

Be it known that I, ALBERT HODSON, a subject of the King of Great Britain, residing at Lincoln, in the county of Logan and State of Illinois, have invented certain Improvements in Safety Devices for Elevators, of which the following is a specification.

My invention is an improvement in safety devices for elevators, and relates more especially to such devices which are applied to mine-cages to arrest the descent of the same in the event the hoisting and lowering cable or appliance is broken from any cause. In the operation of this class of elevators, which are used for conveying workmen in and out of the mine, and for other purposes, the hoisting and lowering rope or cable which is connected to the cage is liable to break from wear and other causes, and when the rope or cable does break the cage is precipitated to the bottom of the shaft unless it is provided with some effective safety appliance for supporting it in such an emergency. In many of the accidents of this nature the cage is either not provided with any kind of safety device or with one that is not effective, and in such instances the cage rapidly falls to the bottom of the shaft to the injury or death of its occupants.

The principal requirement of a safety device of this character is that it shall be entirely automatic in its operation and not depend upon manual operation of any kind. Other requirements are that it shall be quick and positive in its action so as to catch the cage before it has an opportunity to speed downward, and the engaging parts should be of such strength and holding capacity as to firmly and securely grip and hold the cage under all conditions, such as maximum load, etc.

The object of my invention, therefore, is to provide a safety device which will meet all the requirements above enumerated, which will also be simple and compact in construction, and which may be readily and conveniently applied to mine cages now in use without alteration of either the cage or shaft in which it travels. These objects and advantages are attained by a particular construction and adaptation of certain instrumentalities, all as hereinafter fully described and specifically set forth in the appended claims.

Figure 1:
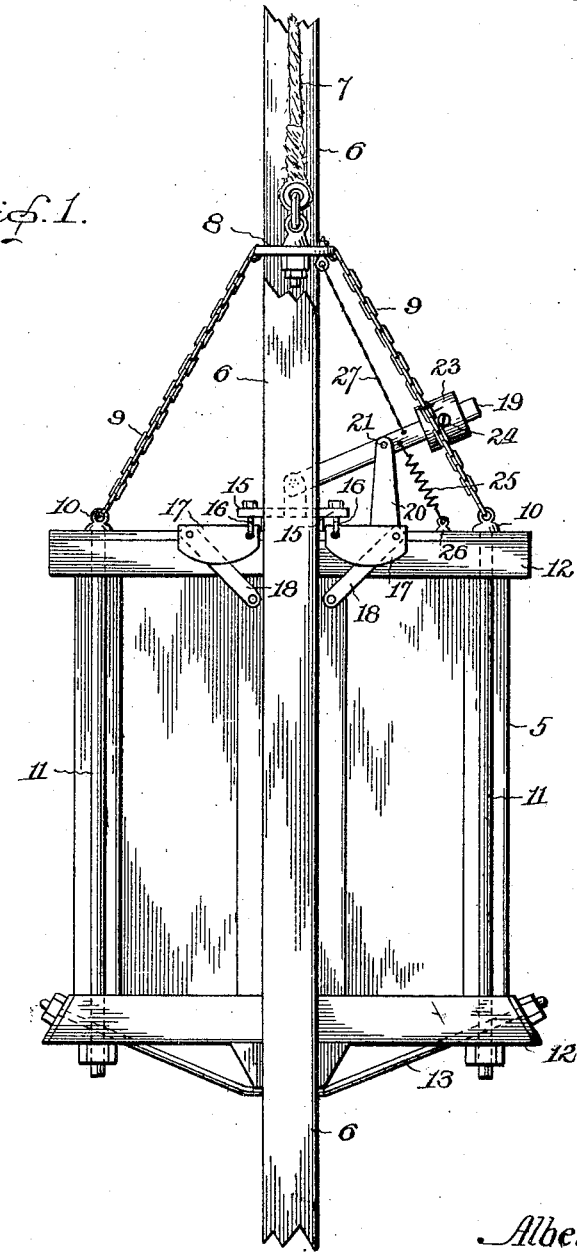
Figure 2:
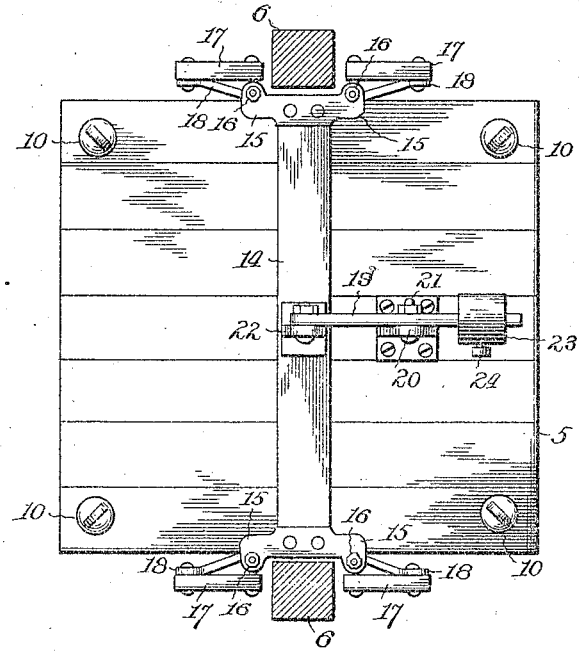
Figure 3:
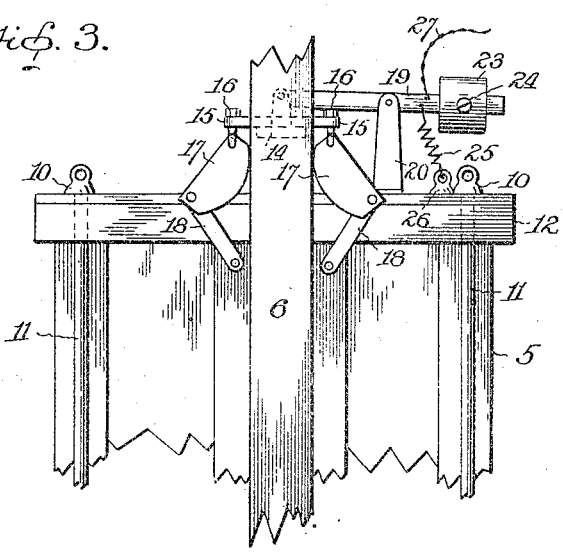

In the accompanying drawings, forming a part hereof: Figure 1 is a side view, showing the application of my invention to an ordinary mine-cage, the several operative parts of the device being shown in their normal position which will not interfere with the usual running of the cage. Fig. 2 is a plan view of the mine-cage and safety devices carried thereby, and including a cross-section of the uprights or guides between which the cage travels. Fig. 3 is a view illustrating the position of the parts of the safety device when thrown into operative position to support the cage between the uprights of the shaft.

Like numerals of reference indicate like parts in all the figures of the drawings.

Referring to said drawings, 5 designates the mine-cage, and 6 6 the uprights or vertical guides between which the cage travels. The cage is connected to the hoisting and lowering rope or cable 7 by means of a spreader 8, and connecting chains 9, the latter being attached to eyes 10 at the upper ends of rods or bolts 11 which pass through the upper and lower horizontal end beams 12 of the cage and serve to strengthen the structure. The cage may be further braced by means of truss-rods 13 located at the bottom thereof. These parts are all common to elevators of this character, and are shown herein for the purpose of illustrating the application of my invention; but it will be understood that I do not wish to limit myself to this application of my improved safety devices, as it will be obvious the same may be used in connection with other types of elevators, such as passenger and freight elevators used in buildings of various kinds.

In carrying out my invention I employ in the first instance a board or metal strip 14, which extends across the top of the cage or car at the center thereof and between the uprights or guides 6 6, said board or strip being provided at its ends with lateral arms 15 which project beyond the opposite sides of the uprights or guides. Loosely connected to the outer end of each arm 15, by means of an eye-bolt or other suitable connection, as 16, is a cam-plate or gripping shoe 17, and connecting this cam-plate or gripping-shoe to the adjoining side of the cage is a metal bar or link 18, the connection of the eye-bolt 16 and link 18 being at opposite ends of the cam-plate or gripping-shoe, as shown. As will be seen the arrangement of the cam-plates or gripping-shoes is in pairs, and those of each pair are located at opposite sides of the upright or guide. The disposition of these parts, to wit: the board or metal strip 14, cam-plates or gripping-shoes 17, and connecting bars 18 is such that when the board or strip is in its normal position or resting upon the top of the car or cage the cam-plates or gripping-shoes will be disposed horizontally and at a slight distance away from the uprights or guides, and when the board or metal strip 14 is raised it will bring the cam-surface of each plate or shoe 17 against the upright so that the weight of the cage or elevator will cause each pair of cam plates or shoes to act after the manner of a grip by clamping against opposite sides of the upright. It may be here noted that these operative parts of the safety device will be constructed of sufficient strength to withstand the jar and weight of the cage when said parts are thrown into operative engagement with the uprights of the shaft, and of course the means of connection of said parts will be correspondingly strong.

For the purpose of raising and lowering the board or metal strip 14, and to accomplish this operation automatically, I provide a lever 19 fulcrumed intermediately at the upper end of a standard 20 by means of a pivot-bolt 21, and pivotally connected at its inner end to an upwardly-projecting arm 22 extending from the aforesaid board or metal strip, the outer end of said lever being provided with a weight 23, slidable thereon and held in an adjusted position by a set-screw 24. The standard 20 and arm 22 are each provided with a base-plate by which they are secured, to the top of the cage and board, respectively. It is intended that the weight 23 will serve the purpose of lifting the board or metal plate and thereby move the cam plates or shoes into engagement with the uprights, so that the weight of the cage acting through the intervention of the links or bars 18 will cause said cam-plates or shoes to firmly grip the uprights. However, instead of a weight I may use an ordinary helical spring, as 25, and in some instances may find it advantageous to use both. When the spring is used it is connected at one end to the lever and at its other end to an eye-bolt, as 26, the latter being secured to the top of the cage.

Now in order that the lever 19 may be held so as to normally dispose the board or metal strip 14 in its lowermost position, and therefore against the action of the weight or spring, I employ a chain or connection 27 which is attached at one end to the lever adjacent the weight or spring and at its other end to the spreader 8 of the hoisting and lowering device, the latter connection being preferably near the center of the spreader. This chain 27 is of such length with respect to the cable connections to the cage that the lever 19 and coöperative parts of the safety device will be in the position shown in Fig. 1 when the cage is properly supported by the hoisting and lowering devices. Of course when the tension of this chain is removed from any cause, for instance by the breaking of the rope or cable 7, the outer end of the lever will fall by reason of the weight or spring and the safety devices will then be thrown into operation. The cable or rope 7 may break from defective material or wear, or, as sometimes happens, it may break from overwinding, that is drawing the cage up too far by overwinding the cable on the winding drum. In accidents of this latter nature the cage is prevented from falling the full depth of the mine-shaft, inasmuch as the automatic operation of the lever 19 will quickly throw the cams into engagement with the uprights and by gripping the latter will hold the cage suspended between the uprights until necessary repairs can be made.

It will be noted that by connecting the small chain 27 to the center portion of the spreader-plate 8 and having the same of such length as to be under slight tension when the board or metal strip 14 is resting upon the cage, in the event any one of the chains 9 should break the extra tension coming upon said chain 27 would quickly break the same and permit the safety devices to be applied; and in fact unless the said lever 19 is held by the chain the parts of the safety device will operate to hold the cage.

From the foregoing description, in connection with the accompanying drawings, the construction, operation and practical advantages of my improved safety devices will be readily understood, and it will be noted that the same may be applied to mine cages or elevator cars now in use and at very little expense. It will also be noted that in use the action of the devices is quick and effective, so that the descent of the cage or car in case of accident will be arrested before such cage or car attains any considerable speed.

In its application to an elevator for mine shafts in which the uprights or guides are made of wood instead of metal the cam-surfaces of the plates or shoes 17 may be roughened to insure a better hold, but in either instance the gripping action of the cam-plates will be sufficient to stop the cage, and as this gripping action depends on frictional engagement the cage will be gradually brought to a full stop without subjecting the occupants of the cage to a sudden jar. This gradual stopping of the cage also relieves the operative parts of the safety device of any excessive strain which would tend to break them or their connections.

The drawings show the ordinary rectangular shaped uprights as guides for the cage or car, and consequently the engaging edges of the cam-plates or gripping shoes are flat to engage the flat sides of said uprights; but in such instances where heavy cables or round iron bars are employed in the shaft as the guides for the cage or car the engaging edges of the cam-plates or gripping-shoes are grooved to embrace the cable or round bar, as will be understood. Other changes or modifications may be made under varying conditions, within the spirit and scope of my claims.

Having described my invention, I claim:—

1. In a safety device for elevators, the combination with the car or cage, cable and uprights or guides, of a strip mounted on the car and adapted to have a vertical movement, cam plates pivotally connected at one end to said strip, links or bars pivoted to the other ends of said cam-plates and to the cage, a pivoted lever connected at one end to the vertically movable strip, and provided with a weight at its other end, and a chain connected to the weight end of the lever and to the lifting cable of the cage and adapted to hold the weighted end of the lever elevated.

2. In a safety device for elevators, the combination, with the car or cage, the hoisting and lowering device comprising a spreader plate, cable and connecting chains, and the uprights or guides between which the car or cage travels, of a vertically movable strip mounted above the car or cage between the uprights, cam-plates at opposite sides of the uprights and pivotally connected at one end to the aforesaid strip, links or bars connected to the outer ends of the cam-plates and to the car or cage, a lever pivoted on top of the car or cage and pivotally connected at its inner end to the strip, a weight on the outer end of the lever, and a chain connected to the weighted end of the lever and to the spreader of the hoisting and lowering device, substantially as shown and described.

3. In a safety device for elevators, the combination with the cage, the cable and uprights between which the cage travels, of a strip 14, cams 17 pivoted thereto, bars 18 connecting the cams to the car, a lever 19 pivoted at one end to the strip, a weight at the outer end of the lever, a spring 25 connected to the weighted end of the lever and to the car or cage, and a chain 27 connected to said weighted end of the lever and to the cable and adapted to hold the weighted end of the lever elevated, as herein shown and described.

In testimony whereof I have signed my name to this specification in the presence of two subscribing witnesses.

ALBERT HODSON.

Witnesses:
    A. D. CADWALLADER,
    JOHN H. BECKERS.